(12) United States Patent
Washino et al.

(10) Patent No.: US 8,138,271 B2
(45) Date of Patent: Mar. 20, 2012

(54) CROSSLINKABLE COMPOSITION AND MOLDED ARTICLE MADE OF SAME

(75) Inventors: Keiko Washino, Osaka (JP); Meiten Koh, Osaka (JP); Yasuko Takagahara, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 13/180,188

(22) Filed: Jul. 11, 2011

(65) Prior Publication Data

US 2011/0263795 A1    Oct. 27, 2011

Related U.S. Application Data

(62) Division of application No. 12/091,694, filed as application No. PCT/JP2006/320458 on Oct. 13, 2006, now abandoned.

(30) Foreign Application Priority Data

Oct. 27, 2005  (JP) ................................. 2005-313521
Apr. 21, 2006  (JP) ................................. 2006-118145

(51) Int. Cl.
*C08F 214/22* (2006.01)
*C08F 214/28* (2006.01)

(52) U.S. Cl. ............... 525/326.3; 525/326.2; 525/326.4; 525/199; 525/200

(58) Field of Classification Search ................ 525/326.2, 525/326.3, 326.4, 199, 200
See application file for complete search history.

(56) References Cited

U.S. PATENT DOCUMENTS

| 4,243,770 A | 1/1981 | Tatemoto et al. |
| 4,394,489 A | 7/1983 | Aufdermarsh |
| 4,525,539 A | 6/1985 | Feiring |
| 5,677,389 A | 10/1997 | Logothetis et al. |
| 5,824,749 A | 10/1998 | Sonoi et al. |
| 2003/0208003 A1 | 11/2003 | Schmiegel |
| 2004/0122182 A1 | 6/2004 | Kawasaki et al. |
| 2008/0287627 A1* | 11/2008 | Noguchi et al. ............... 526/247 |
| 2009/0124759 A1* | 5/2009 | Washino et al. ............... 525/199 |

FOREIGN PATENT DOCUMENTS

| EP | 0 905 177 A1 | 3/1999 |
| EP | 1 243 601 A1 | 9/2002 |
| EP | 1 589 047 A1 | 10/2005 |
| EP | 1 741 748 A1 | 1/2007 |
| GB | 1496084 | 12/1977 |
| JP | 53-004035 | 2/1978 |
| JP | 53-125491 | 11/1978 |
| JP | 58-152041 | 9/1983 |
| JP | 59-109546 A | 6/1984 |
| JP | 6-128334 | 5/1994 |
| JP | 8-104789 A | 4/1996 |
| TW | 237653 B | 8/2005 |
| WO | 00/29479 A1 | 5/2000 |
| WO | 02/092683 A1 | 11/2002 |

OTHER PUBLICATIONS

Preparation of Amine Website Snapshot of http://www.chemguide.co.uk/organicprops/amines/preparation.html taken Sep. 13, 2010.
Chapter 19—website (http://web.archive.org/web/20050505220932/http://crab.rutgers.edu/~alroche/Ch19.doc) archived May 5, 2005.

* cited by examiner

*Primary Examiner* — Vasu Jagannathan
*Assistant Examiner* — Mark Kaucher
(74) *Attorney, Agent, or Firm* — Sughrue Mion, PLLC

(57) ABSTRACT

The present invention provides a crosslinkable composition being capable of providing a molded article and a sealing material for an oxygen sensor which have excellent long-term heat resistance and satisfactory compression set. Also there is provided a molded article and a sealing material for an oxygen sensor which have excellent long-term heat resistance and satisfactory compression set. The crosslinkable composition comprises (A) a compound having at least one specific crosslinkable reaction group and (B) a nonperfluoro fluorine-containing elastomer being crosslinkable with the compound (A).

7 Claims, No Drawings

CROSSLINKABLE COMPOSITION AND MOLDED ARTICLE MADE OF SAME

CROSS REFERENCE TO RELATED APPLICATIONS

This is a divisional application of U.S. application Ser. No. 12/091,694 filed Apr. 25, 2008, which is a U.S. National Stage Application of PCT/JP2006/320458 filed Oct. 13, 2006, which claims benefit of Japanese Application Nos. 2005-313521 filed Oct. 27, 2005, and 2006-118145 filed Apr. 21, 2006. The above-noted applications are incorporated herein by reference in their entirety.

TECHNICAL FIELD

The present invention relates to a crosslinkable composition comprising a compound having at least one specific crosslinkable reaction group and a nonperfluoro fluorine-containing elastomer being crosslinkable with the compound, and a molded article and a sealing material for an oxygen sensor obtained by crosslinking the composition.

BACKGROUND ART

Fluorine-containing elastomers are molded into an O-ring, a hose, a stem seal, a shaft seal and a diaphragm and widely used in the fields of automobile industry, semiconductor industry and chemical industry because of their prominent heat resistance, chemical resistance, solvent resistance and fuel oil resistance. For fluorine-containing elastomers, a technique of undergoing a peroxide crosslinking reaction (for example, cf. JP53-125491A) and a technique of undergoing a polyol crosslinking reaction (for example, cf. JP53-4035B and JP6-128334A) have been generally employed.

However characteristics required therefor are becoming strict with progress of technology. In the fields of aeroplane and space, semiconductor manufacturing equipment, chemical plants and automobile industry, sealing property under higher temperature environment of more than 200° C. is demanded, and it is difficult to satisfy such requirements in the cases of molded articles and sealing materials obtained by conventional methods of peroxide crosslinking and polyol crosslinking.

To satisfy such requirements under higher temperature environment, proposals have been made to enhance heat resistance by improving a crosslinking system. For example, there are known a triazine crosslinking system forming a triazine ring with an organotin compound by using a fluorine-containing elastomer having cyano group introduced as a cure site (for example, cf. JP58-152041A), an oxazole crosslinking system forming an oxazole ring with bisaminophenol similarly by using a fluorine-containing elastomer having cyano group introduced as a cure site, an imidazole crosslinking system forming an imidazole ring with a bisdiaminophenyl compound (for example, cf. JP59-109546A) and a thiazole crosslinking system forming a thiazole ring with bisaminothiophenol (for example, cf. JP8-104789A), and a composition comprising a fluorine-containing elastomer having a carboxyl group as a cure site at an end of its trunk chain and/or its branched chain and an oxazole crosslinking agent, an imidazole crosslinking agent or a thiazole crosslinking agent (for example, cf. WO 00/29479).

However any of the proposals intended to use a perfluoro elastomer as a fluorine-containing elastomer, and there were no fluorine-containing elastomer compositions which are excellent in compression set at high temperature and are obtained by subjecting a nonperfluoro elastomer to the above-mentioned oxazole crosslinking, imidazole crosslinking or thiazole crosslinking.

DISCLOSURE OF INVENTION

The present invention provides a crosslinkable composition being capable of giving a molded article and sealing material for oxygen sensor having excellent heat resistance for a long period of time and satisfactory compression set. The present invention also provides a molded article and sealing material for oxygen sensor having excellent heat resistance for a long period of time and satisfactory compression set.

Namely, the present invention relates to a crosslinkable composition comprising (A) a compound having at least one reaction group selected from the group consisting of a crosslinkable reaction group represented by the general formula (1):

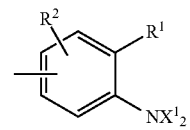

wherein $X^1$s are the same or different and each is hydrogen atom or a monovalent organic group; $R^1$ is $-OR^3$ or $-SR^3$, and $R^3$ is hydrogen atom or a monovalent organic group; $R^2$ is hydrogen atom, $-OR^3$ or $-SR^3$, and $R^3$ is as defined above, a crosslinkable reaction group represented by the general formula (2):

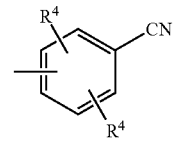

wherein $R^4$s are the same or different and each is hydrogen atom or cyano group, and a crosslinkable reaction group represented by the general formula (3):

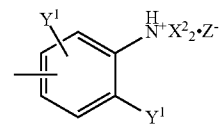

wherein $X^2$s are the same or different and each is hydrogen atom or a monovalent organic group; $Z^-$ is an anion derived from an acid; $Y^1$ is $-OH$, $-SH$ or $-N^+X^2{}_2H.Z^-$ ($X^2$ and $Z^-$ are as defined above), a compound represented by the general formula (4):

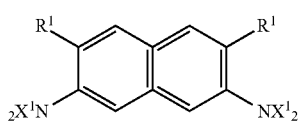

wherein $X^1$ and $R^1$ are as defined above,
a compound represented by the general formula (5):

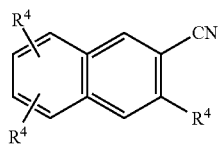

wherein $R^4$ is as defined above, or
a compound represented by the general formula (6):

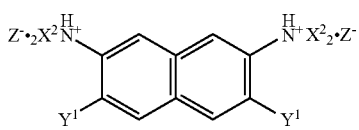

wherein $X^2$, $Z^-$ and $Y^1$ are as defined above, and
(B) a nonperfluoro fluorine-containing elastomer being capable of crosslinking reaction with the compound (A).

The compound (A) is preferably a compound having a symmetric structure.

It is preferable that the nonperfluoro fluorine-containing elastomer (B) has, at least at either its trunk chain or an end of its side chain, at least one kind of crosslinkable functional group selected from the group consisting of cyano group, a carboxyl group, an alkoxycarbonyl group and an acid halide group as a cure site being capable of crosslinking reaction with the compound (A).

It is preferable that the nonperfluoro fluorine-containing elastomer (B) has a vinylidene fluoride unit and/or a tetrafluoroethylene unit and/or a hexafluoropropylene unit and at least one kind of different monomer unit.

It is preferable that the nonperfluoro fluorine-containing elastomer (B) is
(1) vinylidene fluoride/hexafluoropropylene copolymer,
(2) vinylidene fluoride/tetrafluoroethylene/hexafluoropropylene copolymer,
(3) tetrafluoroethylene/propylene copolymer,
(4) hexafluoropropylene/ethylene copolymer,
(5) tetrafluoroethylene/vinylidene fluoride/fluoro(alkyl vinyl ether) copolymer, or
(6) chlorotrifluoroethylene/vinylidene fluoride/fluoro(alkyl vinyl ether) copolymer.

It is preferable that the nonperfluoro fluorine-containing elastomer (B) has at least one kind of crosslinkable functional group selected from the group consisting of cyano group, a carboxyl group, an alkoxycarbonyl group and an acid halide group in its side chain in an amount of 0.1 to 5% by mole.

The present invention also relates to a molded article and a sealing material for an oxygen sensor obtained by crosslinking the above-mentioned crosslinkable composition.

BEST MODE FOR CARRYING OUT THE INVENTION

The present invention relates to the crosslinkable composition comprising (A) a compound having at least one reaction group selected from the group consisting of a crosslinkable reaction group represented by the general formula (1):

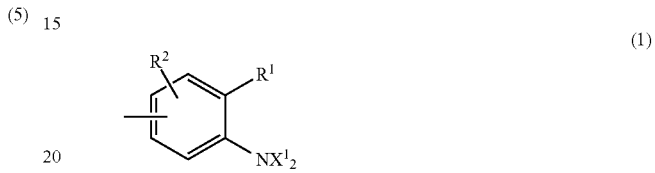

wherein $X^1$s are the same or different and each is hydrogen atom or a monovalent organic group; $R^1$ is —$OR^3$ or —$SR^3$, and $R^3$ is hydrogen atom or a monovalent organic group; $R^2$ is hydrogen atom, —$OR^3$ or —$SR^3$, and $R^3$ is as defined above, a crosslinkable reaction group represented by the general formula (2):

wherein $R^4$s are the same or different and each is hydrogen atom or cyano group, and a crosslinkable reaction group represented by the general formula (3):

wherein $X^2$s are the same or different and each is hydrogen atom or a monovalent organic group; $Z^-$ is an anion derived from an acid; $Y^1$ is —OH, —SH or —$N^+X^2{}_2H.Z^-$ ($X^2$ and $Z^-$ are as defined above), a compound represented by the general formula (4):

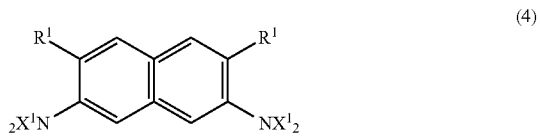

wherein $X^1$ and $R^1$ are as defined above,
a compound represented by the general formula (5):

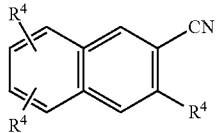

(5)

wherein $R^4$ is as defined above, or
a compound represented by the general formula (6):

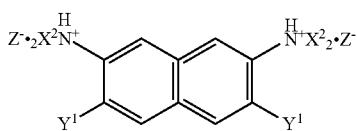

(6)

wherein $X^2$, $Z^-$ and $Y^1$ are as defined above, and
(B) a nonperfluoro fluorine-containing elastomer being capable of crosslinking reaction with the compound (A).

Tetraamine which is an imidazole crosslinking agent known as a crosslinking agent for perfluoro elastomers is not preferable because it has a high nucleophilicity and attacks the trunk chain of the elastomer.

It is preferable that the compound (A) having the crosslinkable reaction group represented by the general formula (1) has at least one crosslinkable reaction group represented by the general formula (1), more preferably 2 to 4 crosslinkable reaction groups, further preferably two crosslinkable reaction groups.

The number of crosslinkable reaction groups represented by the general formula (1) may be one, and in that case, a crosslinking reaction can be carried out when the compound (A) has at least one other crosslinkable reaction group. In this case, any optional one is selected as the other crosslinkable reaction group, and from the viewpoint of heat resistance, especially a crosslinkable reaction group having two or more amino groups is preferable. However since the crosslinkable reaction group represented by the general formula (1) has high heat resistance, it is preferable that crosslinkable reaction groups are comprised of only those represented by the general formula (1).

In the general formula (1), $R^1$ is —$OR^3$ or —$SR^3$, and $R^3$ is hydrogen atom or a monovalent organic group.

The monovalent organic group is not limited particularly, and examples thereof are an aliphatic hydrocarbon group, phenyl group and benzyl group. Specifically there are, for example, lower alkyl groups having 1 to 10, especially 1 to 6 carbon atoms such as —$CH_3$, —$C_2H_5$, and —$C_3H_7$; fluorine atom-containing lower alkyl groups having 1 to 10, especially 1 to 6 carbon atoms such as —$CF_3$, —$C_2F_5$, —$CH_2F$, —$CH_2CF_3$ and —$CH_2C_2F_5$; phenyl group; benzyl group; phenyl group or benzyl group, in which 1 to 5 hydrogen atoms are replaced by fluorine atoms, such as —$C_6F_5$ and —$CH_2C_6F_5$; and phenyl group or benzyl group, in which 1 to 5 hydrogen atoms are replaced by —$CF_3$, such as —$C_6H_{5-n}(CF_3)_n$ and —$CH_2C_6H_{5-n}(CF_3)_n$ (n is an integer of 1 to 5). Among these, —OH is preferable as $R^1$ from the viewpoint of satisfactory crosslinking reactivity.

In the general formula (1), $R^2$ is hydrogen atom, —$OR^3$ or —$SR^3$, and $R^3$ is as defined above.

In the general formula (1), $X^1$s are the same or different and each is hydrogen atom or a monovalent organic group.

Examples of the monovalent organic group are the same as those exemplified above. Among them, phenyl group and —$CH_3$ are preferable from the viewpoint of especially excellent heat resistance and relatively easy synthesis, and hydrogen atom is preferable from the viewpoint of satisfactory crosslinking reactivity.

Preferable examples of the compound having two crosslinkable reaction groups represented by the general formula (1) are, for instance, compounds represented by the general formula (7):

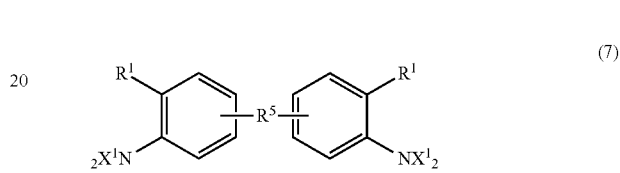

(7)

wherein $R^1$ and $X^1$ are as defined above; $R^5$ is —$SO_2$—, —O—, —CO—, an alkylene group having 1 to 6 carbon atoms, a perfluoro alkylene group having 1 to 10 carbon atoms, a single bond or a group represented by:

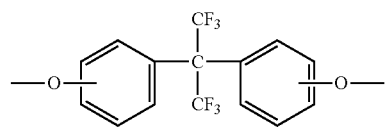

from the viewpoint of easy synthesis.

Examples of the alkylene group having 1 to 6 carbon atoms are a methylene group, an ethylene group, a propylene group, a butylene group, a pentylene group and a hexylene group, and examples of the perfluoro alkylene group having 1 to 10 carbon atoms are

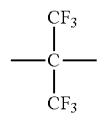

and the like.

It is preferable that the compound (A) having the crosslinkable reaction group represented by the general formula (2) has at least one crosslinkable reaction group represented by the general formula (2), more preferably 2 to 4 crosslinkable reaction groups, further preferably two crosslinkable reaction groups.

$R^4$s are the same or different and each is hydrogen atom or cyano group, and from the viewpoint of crosslinking reactivity, at least one of $R^4$s is preferably cyano group.

Examples of the compound having the crosslinkable reaction group represented by the general formula (2) are, for instance, compounds represented by the general formula (8):

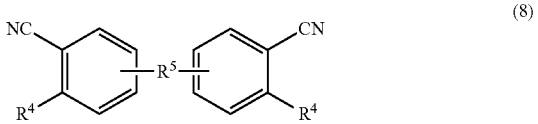

wherein $R^4$ and $R^5$ are as defined above and compounds represented by the general formula (9):

wherein $R^4$ is as defined above.

Examples thereof are those raised below.

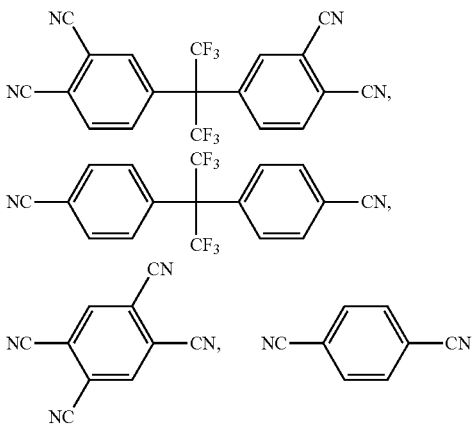

The compound represented by:

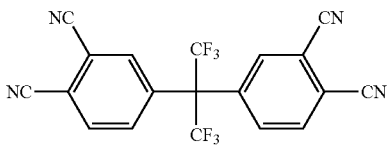

is a novel compound.

It is preferable that the compound (A) having the crosslinkable reaction group represented by the general formula (3) has at least one crosslinkable reaction group represented by the general formula (3), more preferably 2 to 4 crosslinkable reaction groups, further preferably two crosslinkable reaction groups.

$X^2$s are the same or different and each is hydrogen atom or a monovalent organic group, and examples of the monovalent organic group are the same as those raised supra.

The crosslinkable reaction group represented by the general formula (3) can be obtained by a reaction of an acid with an aromatic amine. There are two kinds of acids, a BRøNSTED acid releasing $H^+$ and a LEWIS acid releasing no $H^+$, and a BRøNSTED acid is preferable since a salt being stable up to a specific temperature (crosslinking temperature) can be prepared by using an aromatic amine which is a weak base.

Examples of an acid forming the anion of the general formula (3) are inorganic acids and organic acids.

Examples of an inorganic acid are HF, HCl, HBr, HI, nitric acid, phosphoric acid, sulfuric acid, perchloric acid, carbonic acid boric acid, tungstic acid, chromic acid, $HBF_4$, HPF6, $HAsF_6$, $HSbF_6$, $HTaF_6$, $HAlCl_4$, $HFeCl_4$ and the like. Among these, HCl, nitric acid and carbonic acid are preferable from the viewpoint of easy removal and low corrosiveness.

Examples of an organic acid are carboxylic acids, sulfonic acids, sulfoimidic acids such as bis(trifluoromethanesulfonyl)imidic acid and bis(pentafluoroethanesulfonyl)imidic acid, amidic acid such as trifluoromethanesulfonyl amidic acid, $(CF_3SO_2)_3CH$, $(C_4F_9SO_2)_3CH$ and the like.

Among these, since an acid is removed after the reaction, carboxylic acids and sulfonic acids are preferable, and carboxylic acids are more preferable. Among carboxylic acids, aliphatic carboxylic acids having 1 to 10 carbon atoms are especially preferable since removal thereof is easy. Examples thereof are $CH_3COOH$, $C_2H_5COOH$ and the like.

Examples of the compound having crosslinkable reaction group represented by the general formula (3) are, for instance, compounds represented by the general formula (10):

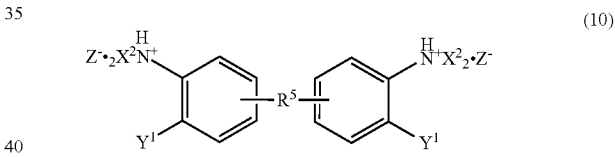

wherein $X^2$, $Y^1$, $Z^-$ and $R^5$ are as defined above.

Further there are specifically compounds represented by the general formula (11):

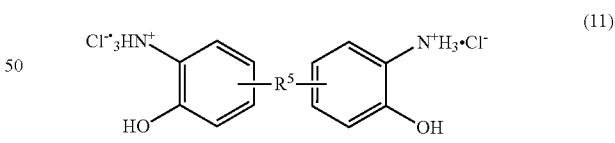

wherein $R^5$ is as defined above.

Also there can be used, as the compound (A), the compound represented by the general formula (4):

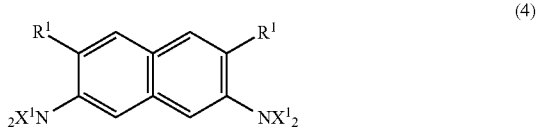

wherein $X^1$ and $R^1$ are as defined above,
the compound represented by the general formula (5):

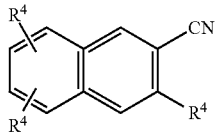 (5)

wherein $R^4$ is as defined above, and
the compound represented by the general formula (6):

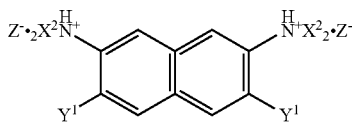 (6)

wherein $X^2$, $Z^-$ and $Y^1$ are as defined above.

Example of the compound represented by the general formula (4) is one raised below.

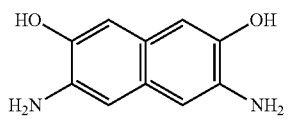

Example of the compound represented by the general formula (5) is a compound represented by the general formula (12):

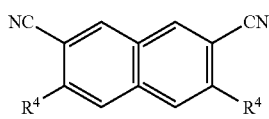 (12)

wherein $R^4$ is as defined above, and more specifically,

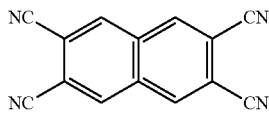

can be raised.

Example of the compound represented by the general formula (6) is one raised below.

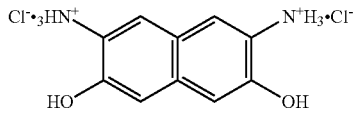

Among these, compounds having a symmetric structure are preferable as the compound (A) because heat resistance is excellent and crosslinking reactivity is satisfactory, and the compound having at least two crosslinkable reaction groups represented by the general formula (1) is more preferable and the compound represented by the general formula (7) is more preferable. Further preferable are 2,2-bis(3-amino-4-hydroxyphenyl)hexafluoropropane and 3,3'-bishydroxybenzidine from the viewpoint of excellent long-term heat resistance and especially satisfactory crosslinking reactivity.

By adding the compound (A) explained above, a crosslinked article having excellent mechanical strength, heat resistance, chemical resistance and cold resistance, especially well-balanced heat resistance and cold resistance can be obtained.

An amount of the compound (A) is preferably 0.1 to 20 parts by weight, more preferably 0.5 to 10 parts by weight based on 100 parts by weight of the nonperfluoro fluorine-containing elastomer (B) being capable of crosslinking reaction. When the amount of the compound (A) is less than 0.1 part by weight, there is a tendency that mechanical strength, heat resistance and chemical resistance sufficient for practical use cannot be obtained, and when the amount of the compound (A) exceeds 20 parts by weight, it takes a lot of time for crosslinking, and there is a tendency that a crosslinked article becomes hard and loses flexibility.

The nonperfluoro fluorine-containing elastomer (B) being capable of crosslinking reaction with the compound (A) is not limited particularly.

Preferable examples of the nonperfluoro fluorine-containing elastomer (B) are those having, at least at either its trunk chain or an end of its side chain, at least one kind of crosslinkable reaction group selected from the group consisting of cyano group (—CN group), a carboxyl group (—COOH group), an alkoxycarbonyl group (—COOR$^6$ group where R$^6$ is a monovalent organic group, and examples of the monovalent organic group are the same as raised supra) and an acid halide group (—COX$^3$ group where $X^3$ is halogen atom, and examples of halogen atom are iodine atom, chlorine atom and bromine atom), as a cure site being capable of crosslinking reaction with the compound (A). Among these, cyano group is more preferable from the viewpoint of crosslinking reactivity. Also from the viewpoint of easy preparation, a carboxyl group and an alkoxycarbonyl group are more preferable.

Examples of the nonperfluoro fluorine-containing elastomer (B) are, for instance, a fluorine-containing rubber (a), a thermoplastic fluorine-containing rubber (b) and a rubber composition comprising such a fluorine-containing rubber, and particularly a fluorine-containing rubber (a) is preferable.

The fluorine-containing rubber (a) is not limited particularly, and is preferably one having a vinylidene fluoride (VdF) unit and/or a tetrafluoroethylene (TFE) unit and/or a hexafluoropropylene (HFP) unit and at least one kind of additional monomer unit since it is relatively cheap, is good in polymerizability and gives a compound having excellent heat resistance, cold resistance and chemical resistance.

Examples of at least one kind of additional monomer are, for instance, fluorine-containing monomers such as TFE, HFP, fluoro(alkyl vinyl ether), perfluoro(alkyl vinyl ether) (PAVE), chlorotrifluoroethylene (CTFE), trifluoroethylene, trifluoropropylene, tetrafluoropropylene, pentafluoropropylene, trifluorobutene, tetrafluoroisobutene, vinyl fluoride and iodine-containing fluorinated vinyl ether; and non-fluorine-containing monomers such as ethylene (Et), propylene (Pr) and alkyl vinyl ether. Among these fluorine-containing monomers and non-fluorine-containing monomers, one kind thereof can be used, or two or more kinds thereof can be used in combination.

At least one kind of PAVE represented by the general formula (13):

$$CF_2=CFO(CF_2CFY^2O)_p-(CF_2CF_2CF_2O)_q-R_f^1 \quad (13)$$

where $Y^2$ represents a fluorine atom or —$CF_3$; $R_f^1$ represents a perfluoroalkyl group having 1 to 5 carbon atoms; p represents 0 or an integer of 1 to 5; q represents 0 or an integer of 1 to 5, can be used, or two or more kinds thereof can be used in combination. Among those represented by the general formula (13), perfluoro(methyl vinyl ether) and perfluoro (propyl vinyl ether) are preferable, and especially perfluoro (methyl vinyl ether) is preferable.

Specifically from the viewpoint of compatibility with the compound (A), a VdF/HFP copolymer, a VdF/HFP/TFE copolymer, a VdF/CTFE copolymer, a VdF/CTFE/TFE copolymer, a VdF/PAVE copolymer, a VdF/TFE/PAVE copolymer, a VdF/HFP/PAVE copolymer, a VdF/HFP/TFE/PAVE copolymer, a VdF/TFE/Pr copolymer and a VdF/Et/HFP copolymer are preferable, and especially a VdF/HFP copolymer and a VdF/HFP/TFE copolymer are preferable.

A proportion of a VdF/HFP copolymer is preferably 45 to 85/55 to 15% by mole, more preferably 50 to 80/50 to 20% by mole, further preferably 60 to 80/40 to 20% by mole.

A proportion of a VdF/HFP/TFE copolymer is preferably 40 to 80/10 to 35/10 to 25% by mole.

A proportion of a VdF/PAVE copolymer is preferably 65 to 90/10 to 35% by mole.

A proportion of a VdF/TFE/PAVE copolymer is preferably 40 to 80/3 to 40/15 to 35% by mole.

A proportion of a VdF/HFP/PAVE copolymer is preferably 65 to 90/3 to 25/3 to 25% by mole.

A proportion of a VdF/HFP/TFE/PAVE copolymer is preferably 40 to 90/0 to 25/0 to 40/3 to 35% by mole, more preferably 40 to 80/3 to 25/3 to 40/3 to 25% by mole.

Also from the viewpoint of amine resistance, a TFE/Pr copolymer, a Et/HFP copolymer and a Et/HFP/TFE copolymer are preferable.

A proportion of a TFE/Pr copolymer is preferably 40 to 70/60 to 30% by mole, more preferably 50 to 60/50 to 40% by mole.

A proportion of a Et/HFP copolymer is preferably 35 to 80/65 to 20% by mole, more preferably 40 to 75/60 to 25% by mole.

A proportion of a Et/HFP/TFE copolymer is preferably 35 to 75/50 to 25/15 to 0% by mole, more preferably 45 to 75/45 to 25/10 to 0% by mole.

In addition, from the viewpoint of cold resistance, a TFE/VdF/fluoro(alkyl vinyl ether) copolymer and a CTFE/VdF/fluoro(alkyl vinyl ether) copolymer are preferable.

The cure site being capable of crosslinking reaction with the compound (A) may be introduced to the fluorine-containing elastomer by polymer reaction, and from the viewpoint of easy preparation, it is preferable to use a monomer giving a cure site as other monomer in addition to the above-mentioned copolymer. An amount of the monomer giving a cure site is preferably not less than 0.1% by mole, more preferably not less than 0.3% by mole, and preferably not more than 5% by mole, more preferably not more than 2% by mole based on the total amount of monomers constituting the fluorine-containing rubber (including the monomer giving a cure site).

The monomer giving a cure site is one having an ethylenically unsaturated bond and having, as a functional group, cyano group (—CN group), a carboxyl group (—COOH group), an alkoxycarbonyl group (—COOR$^6$ group where R$^6$ is a monovalent organic group, and examples of the monovalent organic group are the same as raised supra), an acid halide group (—COX$^3$ group where X$^3$ is halogen atom, and examples of halogen atom are iodine atom, chlorine atom and bromine atom) or a group represented by:

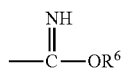

wherein R$^6$ is as defined above.

Of these monomers, preferable as a monomer giving a cure site are those having an ethylenically unsaturated bond and having, as a functional group, cyano group (—CN group) from the viewpoint of compression set of an obtained crosslinked article.

Any of chain compounds and cyclic compounds can be used as the monomer. Examples of cyclic compounds are those having the above-mentioned functional group such as cyclopentene and its derivative, norbornene and its derivative, polycyclic norbornene and its derivative, vinylcarbazole and its derivative, and compounds obtained by substituting a part or the whole of hydrogen atoms of the above-mentioned compounds by halogen atoms, especially fluorine atoms or fluorine-containing alkyl groups. From the viewpoint of polymerizability, chain compounds are preferable. Of chain compounds, especially monomers represented by the following general formula (14) are preferable.

$$CY^3Y^4=CY^5(O)_m(R^7)_n-X^4 \quad (14)$$

wherein $Y^3$, $Y^4$ and $Y^5$ are the same or different and each is hydrogen atom, halogen atom, —$CH_3$ or —$CF_3$; $R^7$ is a divalent organic group; n is 0 or 1; m is 0 when n is 0, and m is 0 or 1 when n is 1; $X^4$ is any one of the above-mentioned functional groups.

Among these monomers, from the viewpoint of polymerizability, those having hydrogen atoms or halogen atoms as $Y^3$, $Y^4$ and $Y^5$ are preferable, and fluorine atoms are especially preferable out of halogen atoms. Specifically $CH_2=CH—$, $CH_2=CF—$, $CFH=CF—$, $CFH=CH—$ and $CF_2=CF—$ are preferable, and $CH_2=CH—$, $CH_2=CF—$ and $CF_2=CF—$ are more preferable. When n is 0, there are exemplified, as a crosslinkable monomer, compounds represented by $CH_2=CHCN$, $CH_2=CHCOOR^6$,

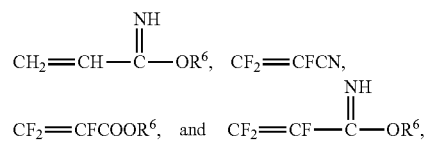

wherein R$^6$ is as defined above.

When n is 0, m is 0, and when n is 1, m may be 0 or 1. When m is 1, $CH_2=CHO—$, $CH_2=CFO—$, $CFH=CFO—$, $CFH=CHO—$ and $CF_2=CFO—$ are preferable, and $CH_2=CHO—$, $CH_2=CFO—$ and $CF_2=CFO—$ are more preferable.

$R^7$ can be optionally selected from divalent organic groups, and from the viewpoint of easy synthesis and polymerization, is preferably an alkylene group which has 1 to 100 carbon atoms and may have ether bond. The number of carbon atoms is more preferably 1 to 50, further preferably 1 to 20. A part or the whole of hydrogen atoms of such an alkylene group may be substituted by halogen atoms, especially by fluorine atoms. The number of carbon atoms exceeding 100 is not preferable because the polymerization becomes difficult and there is a tendency that even if crosslinking is carried out, preferable properties cannot be obtained. The above-mentioned alkylene group may be a linear or branched alkylene group. Examples of a minimum structural unit constituting such a linear or branched alkylene group are as follows.

(i) Linear Minimum Structural Unit

—$CH_2$—, —CHF—, —$CF_2$—, —CHCl—, —CFCl—, —$CCl_2$—

(ii) Branched Minimum Structural Unit

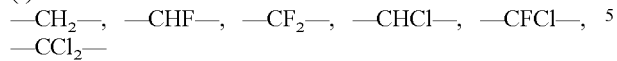
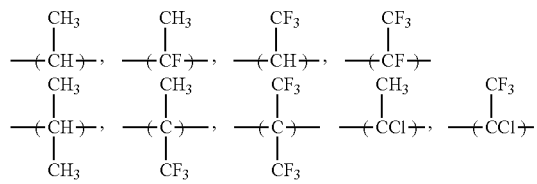

When the alkylene group represented by $R^7$ has no ether group, it has any one of these minimum structural units alone or a combination of linear types (i) or branch types (ii) or an optional combination thereof. When the alkylene group represented by $R^7$ has ether group, it has any one of these minimum structural units and oxygen atom or a combination of linear types (i) or branch types (ii) with oxygen atom or an optional combination thereof. However there is no case where oxygen atoms are bonded. It is preferable that the alkylene group represented by $R^7$ has a structural unit having no Cl among the above-mentioned examples, because a de-HCl reaction by a base does not occur and thus the structural unit is stable.

It is further preferable that $R^7$ has a structure represented by —$R^8$—, —($OR^8$)— or —($R^8O$)— where $R^8$ is an alkylene group which has 1 to 6 carbon atoms and may have fluorine atom.

Examples of $R^8$ are the following linear or branched types.
Examples of linear type are —$CH_2$—, —CHF—, —$CF_2$—, —$CH_2CH_2$—, —$CF_2CH_2$—, —$CF_2CF_2$—, —$CH_2CF_2$—, —$CH_2CH_2CH_2$—, —$CH_2CH_2CF_2$—, —$CH_2CF_2CH_2$—, —$CH_2CF_2CF_2$—, —$CF_2CH_2CH_2$—, —$CF_2CF_2CH_2$—, —$CF_2CH_2CF_2$—, —$CF_2CF_2CF_2$—, —$CH_2CF_2CH_2CF_2$—, —$CH_2CF_2CF_2CF_2$—, —$CH_2CH_2CF_2CF_2$—, —$CH_2CH_2CH_2CH_2$—, —$CH_2CF_2CH_2CF_2CH_2$—, —$CH_2CF_2CF_2CF_2CH_2$—, —$CH_2CF_2CF_2CH_2CH_2$—, —$CH_2CH_2CF_2CF_2CH_2$—, —$CH_2CF_2CH_2CF_2CH_2CH_2$—, —$CH_2CH_2CF_2CF_2CH_2CH_2$—, and the like, and examples of branched type are:

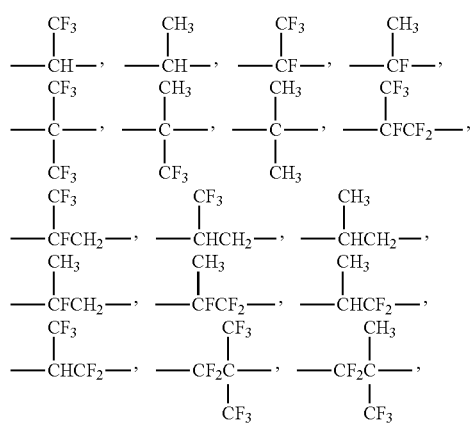
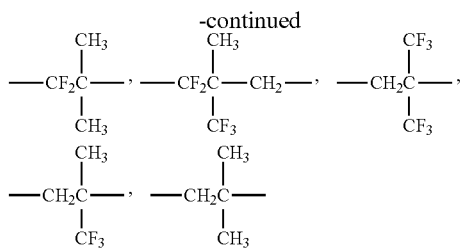

and the like. Also from the above-mentioned structures, there are exemplified the following compounds.

$$CH_2=CH-(CF_2)_n-X^4 \tag{15}$$

wherein n is an integer of 2 to 8, $$CY^6_2=CY^6(CF_2)_n-X^4 \tag{16}$$

wherein $Y^6$ is hydrogen atom or a fluorine atom, and n is an integer of 1 to 8, $$CF_2=CFCF_2R_f^2-X^4 \tag{17}$$

wherein $R_f^2$ is –(OCF$_2$–)$_{\overline{n}}$ or –(OCF(CF$_3$)–)$_{\overline{n}}$, and n is an integer of 0 to 5, $$CF_2=CFCF_2(OCF(CF_3)CF_2)_m(OCH_2CF_2CF_2)_n \\ OCH_2CF_2-X^4 \tag{18}$$

wherein m is an integer of 0 to 5, and n is an integer of 0 to 5, $$CF_2=CFCF_2(OCH_2CF_2CF_2)_m(OCF(CF_3)CF_2)_nOCF \\ (CF_3)-X^4 \tag{19}$$

wherein m is an integer of 0 to 5, and n is an integer of 0 to 5, $$CF_2=CF(OCF_2CF(CF_3))_mO(CF_2)_n-X^4 \tag{20}$$

wherein m is an integer of 0 to 5, and n is an integer of 1 to 8), $$CF_2=CF(OCF_2CF(CF_3))_m-X^4 \tag{21}$$

wherein m is an integer of 1 to 5, $$CF_2=CFOCF_2(CF(CF_3)OCF_2)_nCF(-X^4)CF_3 \tag{22}$$

wherein n is an integer of 1 to 4, $$CF_2=CFO(CF_2)_nOCF(CF_3)-X^4 \tag{23}$$

wherein n is an integer of 2 to 5, $$CF_2=CFO(CF_2)_n-(C_6H_4)-X^4 \tag{24}$$

wherein n is an integer of 1 to 6, $$CF_2=CF(OCF_2CF(CF_3))_nOCF_2CF(CF_3)-X^4 \tag{25}$$

wherein n is an integer of 1 to 2, $$CH_2=CFCF_2O(CF(CF_3)CF_2O)_nCF(CF_3)-X^4 \tag{26}$$

wherein n is an integer of 0 to 5, $$CF_2=CFO(CF_2CF(CF_3)O)_m(CF_2)_n-X^4 \tag{27}$$

wherein m is an integer of 0 to 5, and n is an integer of 1 to 3, $$CH_2=CFCF_2OCF(CF_3)OCF(CF_3)-X^4 \tag{28}$$

$$CH_2=CFCF_2OCH_2CF_2-X^4 \tag{29}$$

$$CF_2=CFO(CF_2CF(CF_3)O)_mCF_2CF(CF_3)-X^4 \tag{30}$$

wherein m is an integer of 0 or more, $$CF_2=CFOCF(CF_3)CF_2O(CF_2)_n-X^4 \tag{31}$$

wherein n is an integer of at least 1, $$CF_2=CFOCF_2OCF_2CF(CF_3)OCF_2-X^4 \tag{32}$$

$$CF_2=CF-(CF_2C(CF_3)F)_n-X^4 \tag{33}$$

wherein n is an integer of 1 to 5, $$CF_2=CFO-(CFY^7)_n-X^4 \quad (34)$$

wherein $Y^7$ is F or $-CF_3$, and n is an integer of 1 to 10, $$CF_2=CFO-(CF_2CFY^8O)_m-(CF_2)_n-X^4 \quad (35)$$

wherein $Y^8$ is F or $-CF_3$, m is an integer of 1 to 10, and n is an integer of 1 to 3), $$CH_2=CFCF_2O-(CF(CF_3)CF_2O)_n-CF(CF_3)-X^4 \quad (36)$$

wherein n is an integer of 0 to 10, $$CF_2=CFCF_2O-(CF(CF_3)CF_2O)_n-CF(CF_3)-X^4 \quad (37)$$

wherein n is an integer of 1 to 10,
and in the general formulas (15) to (37), $X^4$ is any of the above-mentioned functional groups.

When the above-mentioned $X^4$ is $-COOR^6$, in order for the $-COOR^6$ group to act as a cure site, it is preferable that the $-COOR^6$ group has a structure easily undergoing reaction with the reactive functional group of the crosslinking agent. Namely, it is preferable that $R^6$ is easily released. Examples of $R^6$ are sulfonyl esters such a toluenesulfonic acid, nitrotoluenesulfonic acid and trifluoromethanesulfonic acid, phosphoric acid esters and organic phosphoric acid esters. However sulfonyl esters are not preferable because a releasing sulfonic acid has high acidity and there is a fear of causing corrosion of metal (for example, a metal mold of molding machine). In addition, phosphoric acid esters and organic phosphoric acid esters are not preferable because there is a concern that a releasing phosphoric acid and organic phosphoric acid have an adverse effect on environment. Accordingly $R^6$ is preferably an alkyl group which may have an ether bond or an aromatic ring. In this case, the number of carbon atoms is preferably 1 to 20, more preferably 1 to 10, further preferably 1 to 6. Also an alkyl group in which a part or the whole of hydrogen atoms have been replaced by halogen atoms is preferable because it has high releasing property. When $R^6$ is an alkyl group which may have an ether bond or an aromatic ring, examples of $R^6$ are methyl group, ethyl group, propyl group, isopropyl group, butyl group, phenyl group, 1,1,1-trifluoroethyl group, 1,1,1,2,2,3,3-heptafluoropropyl group and 1,1,1,3,3,3-hexafluoroisopropyl group.

In addition, an acid halide group represented by $-COX^3$ is preferable from the viewpoint of high reactivity. However when the polymerization of a fluorine-containing rubber is carried out in an aqueous system, an acid halide group is not preferable because it is unstable in water. When the polymerization of a fluorine-containing rubber is carried out in a non-aqueous system, an acid halide group is preferable.

In the cases of monomers represented by the general formulas (15) to (37), any of the above-mentioned functional groups becomes a cure site, and a crosslinking reaction proceeds with a crosslinking agent.

Further when using an iodine-containing monomer or a bromine-containing monomer in addition to the monomer having the above-mentioned cyano group, carboxyl group, alkoxycarbonyl group or acid halide group or the group represented by:

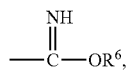

peroxide crosslinking other than the above-mentioned crosslinking reaction can also be carried out.

Also the nonperfluoro fluorine-containing elastomer (B) has, in its side chain, at least one crosslinkable functional group selected from the group consisting of cyano group, a carboxyl group, an alkoxycarbonyl group and an acid halide group preferably in an amount of 0.1 to 5% by mole, more preferably in an amount of 0.3 to 2% by mole. When the amount is less than 0.1% by mole, there is a tendency that sufficient mechanical strength, heat resistance and chemical resistance of the compound obtained by the crosslinking reaction with the compound (A) cannot be obtained. When the amount is more than 5% by mole, it takes a lot of time for crosslinking, and there is a tendency that a crosslinked article becomes hard and loses flexibility.

The nonperfluoro fluorine-containing elastomer (B) used in the present invention can be prepared by usual polymerization method such as an emulsion polymerization method, a suspension polymerization method or a solution polymerization method. Polymerization conditions such as temperature and time at polymerization may be optionally determined depending on kinds of monomers and an intended elastomer.

For emulsion polymerization, a wide range of emulsifying agents can be used. From the viewpoint of inhibiting chain transfer reaction which occurs to molecules of an emulsifying agent during polymerization, salts of carboxylic acids having fluorocarbon chain or fluoropolyether chain are desirable. In addition, it is desirable to use a reactive emulsifying agent.

Preferable polymerization initiators are those being capable of making a carboxyl group or a group being able to generate a carboxyl group (for example, there are acid fluoride, acid chloride and $CF_2OH$, and these produce a carboxyl group in the presence of water) exist at an end of the elastomer. Examples thereof are ammonium persulfate (APS) and potassium persulfate (KPS).

Also a chain transfer agent usually used for adjusting a molecular weight may be used. Examples of a chain transfer agent are compounds represented by the general formulas (38) to (46):

$$I(CF_2CF_2)I \quad (38)$$

$$ICH_2CF_2CF_2(OCF(CF_3)CF_2)_mOCF(CF_3)-X^5 \quad (39)$$

$$ICH_2CF_2CF_2(OCH_2CF_2CF_2)_mOCH_2CF_2-X^5 \quad (40)$$

$$I(CF_2)_nX^5 \quad (41)$$

$$I(CH_2CF_2)_nX^5 \quad (42)$$

$$ICF_2CF_2OCF_2CF(CF_3)OCF_2CF_2-X^5 \quad (43)$$

$$ICH_2CF_2CF_2OCH_2CF_2-X^5 \quad (44)$$

$$ICF_2CF_2OCF_2CF_2-X^5 \quad (45)$$

$$ICF_2CF_2O(CF_2)_nOCF_2CF_2-X^5 \quad (46)$$

wherein $X^5$ is cyano group ($-CN$ group), a carboxyl group ($-COOH$ group), an alkoxycarbonyl group ($-COOR^9$ group where $R^9$ is an alkyl group which has 1 to 10 carbon atoms and may have fluorine atom); m is 0 or an integer of 1 to 5; n is an integer of 1 or more. Among these, the chain transfer agents represented by the general formulas (39) to (46) are preferable because they have a cure site being reactable with the compound (A). In addition, from the viewpoint of satisfactory compression set of the obtained crosslinked article, it is preferable to use those having cyano group ($-CN$ group) as $X^5$ among the chain transfer agents represented by the general formulas (39) to (46).

With respect to a method of separating a polymerization product from a polymerization reaction mixture, a method of coagulation by acid treatment is preferable from the viewpoint of simplification of a separation step. Also a polymerization product may be separated by means of subjecting a polymerization mixture to acid treatment and then carrying out freeze-drying. Further a method of coagulation by an ultrasonic wave or a method of coagulation by a mechanical force can be adopted.

In the nonperfluoro fluorine-containing elastomer (B) used in the present invention, by acid treatment of a polymerization product, groups such as metal salts and ammonium salts of carboxylic acids being present in the polymerization product can be converted to carboxyl groups. Examples of proper acid treatment methods are a method of washing with hydrochloric acid, sulfuric acid or nitric acid and a method of decreasing a pH value of a mixture system after the polymerization reaction to 3 or less with such an acid.

Also a carboxyl group can be introduced by oxidation of a crosslinkable elastomer having iodine or bromine with fuming nitric acid.

Further for introducing cyano group, a carboxyl group or an alkoxycarbonyl group, a method disclosed in WO 00/05959 can be used.

In the present invention, in the fields where especially high purity and non-staining property are not required, usual additives to be blended to fluorine-containing elastomer compositions according to necessity, for example, a filler, a processing auxiliary, a plasticizer, a colorant, a stabilizer and an adhesion auxiliary can be blended to the composition, and in addition, one or more of usual crosslinking agents and crosslinking aids which differ from those mentioned above may be blended.

In the present invention, an inorganic substance can be blended as a crosslinking accelerator.

Preferable examples of an inorganic substance which can be used as a crosslinking accelerator are inorganic oxides, inorganic nitrides and carbon materials. Among them, compounds having adsorptivity of water and alcohol and compounds having a base site are more preferable.

Examples of compounds having adsorptivity of water and alcohol are, for instance, molecular sieves, magnesium sulfate, sodium sulfate, activated carbon and mesoporous silica. Among these, molecular sieves are especially preferable from the viewpoint of improvement in crosslinking speed and compression set.

Examples of compounds having a base site are, for instance, (1) alkali metal, alkali earth metal and oxides thereof, (2) silica, alumina, carbon and activated carbon which contain an alkali metal, alkali earth metal or oxide thereof, (3) inorganic nitrides such as silicon nitride ($Si_3N_4$) and AlN, and (4) silica, alumina, carbon and activated carbon having amine functional group on their surfaces. Among these, (2) silica, alumina, carbon and activated carbon containing alkali metal, alkali earth metal and oxides thereof, (3) inorganic nitrides such as silicon nitride ($Si_3N_4$) and AlN, and (4) silica, alumina, carbon and activated carbon having amine functional group on their surfaces are more preferable, and (3) inorganic nitrides such as silicon nitride ($Si_3N_4$) and AlN are especially preferable.

Also silica, alumina and carbon carrying those compounds can be used suitably.

Examples thereof are magnesium oxide, aluminum oxide, sodium oxide, zinc oxide, hydrotalcite, Zonolite, Wallastonite, talc, ATTAPULGITE, bentonite, zeolite, clay, pyrophyllite, and Selenite. There can be used, as these compounds, CARPLEX #1120 (available from Degussa Japan), CARPLEX #100 (available from Degussa Japan), TOKUSIL Gu (available from TOKUYAMA Corporation), Nipseal ER (available from Nippon Silica Industrial), Nipseal NA (available from Nippon Silica Industrial) and Nipseal g300 (available from Nippon Silica Industrial).

An amount of the inorganic substance used as a crosslinking accelerator is preferably not less than 0.1 part by weight, more preferably not less than 0.5 part by weight, further preferably not less than 1 part by weight, especially preferably not less than 5 parts by weight based on 100 parts by weight of the fluorine-containing elastomer. An upper limit of the amount of the inorganic substance is preferably not more than 50 parts by weight, more preferably not more than 30 parts by weight. When the amount of the inorganic substance is less than 0.1 part by weight, there is a tendency that a sufficient effect of adding the inorganic substance cannot be obtained, and when the amount of the inorganic substance exceeds 50 parts by weight, there is a tendency that hardness becomes high, and moldability is inferior.

When the crosslinkable composition containing the nonperfluoro fluorine-containing elastomer (B) contains the above-mentioned inorganic substance acting as a crosslinking accelerator, the composition can be crosslinked even when it does not contain the compound (A) containing the crosslinkable reaction group represented by the general formulas (1) to (6) explained supra. Concretely, when the composition comprises the nonperfluoro fluorine-containing elastomer (B) having, at least at either its trunk chain or an end of its side chain, cyano group (—CN group) as a cure site and a crosslinking agent, it is possible to carry out triazine crosslinking under the same crosslinking conditions as above by a cyclic trimerization reaction of cyano group. In this case, Lewis acid inorganic solids and Lewis acid organic metals can be used preferably as an inorganic substance other than those mentioned above.

Preferable Lewis acid inorganic solids are Lewis acid inorganic oxides, and examples thereof are, for instance, silver oxide, zinc oxide, aluminum oxide, titanium oxide and tin oxide.

Examples of Lewis acid organic metals are, for instance, tetraphenyltin and tetraphenylPB.

Also elastomers comprising a VdF unit are preferable as the nonperfluoro fluorine-containing elastomer (B) having, at least at either its trunk chain or an end of its side chain, cyano group (—CN group) as a cure site, and more preferable examples thereof are those mentioned supra. With respect to other requirements, preferable embodiments can be employed in the same manner as mentioned supra.

Filler is one functioning to improve physical properties of a crosslinked article such as tensile strength, modulus and hardness, and can be added in the present invention according to necessity.

Examples of the filler are carbon black, talc, silicic acid, silicic acid compound, calcium carbonate, barium sulfate, clay, high styrene resin, phenol resin, and cumaron resin. Among them, examples of carbon black used generally are thermal black, bituminous coal filler, furnace black and channel black. From the viewpoint of compression set, bituminous coal filler is preferable, and from the viewpoint of dynamical physical properties, a mixture of bituminous coal filler and thermal black is preferable.

An amount of filler is preferably 10 to 50 parts by weight, more preferably 15 to 45 parts by weight based on 100 parts by weight of the fluorine-containing elastomer.

When the mixture of bituminous coal filler and thermal black is used, its weight ratio (bituminous coal filler/thermal black) is preferably 9/95 to 80/20, more preferably 30/70 to 70/30. When the ratio is beyond the above-mentioned range, deterioration of compression set and lowering of pressing crack resistance are found.

The composition of the present invention can be prepared by mixing the above-mentioned components by using usual elastomer processing machine, for example, an open roll, a Banbury mixer or a kneader. In addition, the composition can be prepared also by a method of using a closed mixer.

For producing a pre-molded article from the above-mentioned composition, usual known methods may be employed, such as a method of heating and compressing in a metal mold, a method of putting in a heated metal mold under pressure and a method of extruding with an extruder. In the cases of extruded products such as a hose and an electric wire, a crosslinked molded article can be obtained by heating for crosslinking with steam.

In the present invention, crosslinking conditions are not limited particularly, and the crosslinking can be carried out under usual crosslinking conditions for fluorine-containing elastomers. For example, when using the compound having the crosslinkable functional group represented by the general formula (1) or the compound represented by the general formula (4), a crosslinked article can be obtained by charging the compound in a metal mold, carrying out press-crosslinking by holding under pressure at 120° to 250° C. (preferably 180° to 250° C.) for 1 to 120 minutes, and then carrying out oven-crosslinking in an oven at 120° to 320° C. (preferably 250° to 320° C., more preferably 260° to 320° C.) for 0 to 48 hours (preferably 2 to 48 hours).

When using the compound having the crosslinkable functional group represented by the general formula (2) or the compound represented by the general formula (5), a crosslinked article can be obtained by charging the compound in a metal mold, carrying out press-crosslinking by holding under pressure at 120° to 300° C. (preferably 180° to 250° C.) for 1 to 180 minutes, and then carrying out oven-crosslinking in an oven at 120° to 320° C. (preferably 250° to 320° C., more preferably 260° to 320° C.) for 0 to 48 hours (preferably 2 to 48 hours).

When using the compound having the crosslinkable functional group represented by the general formula (3) or the compound represented by the general formula (6), a crosslinked article can be obtained by charging the compound in a metal mold, carrying out press-crosslinking by holding under pressure at 120° to 250° C. (preferably 180° to 250° C.) for 1 to 120 minutes, and then carrying out oven-crosslinking in an oven at 120° to 320° C. (preferably 250° to 320° C., more preferably 260° to 320° C.) for 0 to 48 hours (preferably 2 to 48 hours).

In addition, crosslinking may be carried out in combination by adding bis(aminophenol) AF or the like to a composition for known method of crosslinking of an elastomer, for example, polyamine crosslinking, polyol crosslinking or peroxide crosslinking. However it is more preferable not to carry out such crosslinking, from the viewpoint of heat resistance and compression set of the obtained molded article.

The molded article of the present invention can be obtained by crosslinking and molding of the crosslinkable composition of the present invention. The molded article of the present invention is excellent in long-term heat resistance and compression set.

The molded article of the present invention is useful as various molded articles used in a variety of fields, and is useful as various molded articles used in the following fields, as sealing materials, especially as sealing materials for oxygen sensors for engines of transportation equipment (automobiles, etc.).

Preferable fields are semiconductor-related fields such as semiconductor manufacturing equipment, liquid crystal panel manufacturing apparatuses, plasma panel manufacturing apparatuses, plasma addressed liquid crystal panels, field-emission display panels, and solar cell boards, and the fields of automobile, aircraft, rocket, marine vessel, chemical product plants, medicals such as pharmaceuticals, photograph such as developing machine, printing such as printing machine, painting such as painting equipment, equipment in food plants, equipment in atomic power plants, iron and steel industry such as steel sheet processing equipment, general industry, fuel cells, and electronic parts.

EXAMPLES

Hereinafter, the present invention is explained based on Examples, however, the present invention is not limited thereto. Evaluation method
<Analysis of Composition>
Measured by $^{19}$F-NMR (Model AC300P available from BRUKER).
<Compression Set>
A compression set of an O-ring (AS-568A-214) after left at 250° C. for 70 hours, 168 hours, 336 hours, 500 hours and 1,000 hours is measured according to JIS K6301.

Preparation Example 1

Synthesis of Elastomer (B-1) Having COOH Group

A 6-liter stainless steel autoclave without an ignition source was charged with 2.4 liter of pure water and 4.8 g of $C_7F_{15}COONH_4$ as an emulsifying agent. After the inside of a system was sufficiently replaced with a nitrogen gas to deaerate the system, an inside temperature was raised to 80° C. while stirring at 700 rpm, and a gas mixture of VdF and HFP (molar ratio of VdF/HFP=50/50) was introduced thereto to give an inside pressure of 1.52 MPa·G. Then, 4 ml of aqueous solution of ammonium persulfate (APS) having a concentration of 12 mg/ml was introduced with pressurized nitrogen to initiate a reaction.

When the inside pressure was lowered to 1.48 MPa·G as polymerization proceeded, 1.3 g of $I(CF_2CF_2)_2I$ was introduced with pressurized nitrogen. Then, a gas mixture of VdF/HFP (molar ratio of 78/22) was introduced so that the inside pressure was increased to 1.52 MPa·G, and thereafter, as the reaction proceeded, pressurized VdF and HFP were introduced to repeat increase and decrease in pressure between 1.48 MPa·G and 1.52 MPa·G, and at the same time, 34.3 g of $CF_2$=$CFOCF_2CF(CF_3)OCF_2CF_2COOH$ (CBVE) was introduced with pressurized nitrogen.

When the total charging amount of VdF and HFP reached 400 g seven hours after starting of the polymerization reaction, the autoclave was cooled and unreacted monomers were discharged to obtain 3,004 g of an aqueous dispersion having a solid content of 14.7% by weight.

Out of the obtained aqueous dispersion, 2,000 g was diluted with 2,000 g of water, and slowly added with stirring to 2,000 g of 3.5% by weight aqueous solution of hydrochloric acid. After the solution was stirred for 30 minutes after the adding, coagulated substances were filtered, and 500 g of the obtained polymer was poured into HCFC-141b, followed by stirring for five minutes and filtering again. Then after washing with water and filtering were repeated four times, 12-hour vacuum drying was carried out at 100° C. to obtain 290 g of a polymer (crosslinkable fluorine-containing elastomer (B-1)).

As a result of an analysis, the monomer unit composition of this polymer was found to be VdF/HFP/CBVE=76.3/22.2/1.5 in % by mole. According to an infrared spectroscopic analysis, characteristic absorption of a carboxyl group was recognized at around 1,773 cm$^{-1}$ and characteristic absorption of an OH group was recognized at around 3,538 cm$^{-1}$ and 3,090 cm$^{-1}$. A Mooney viscosity at 100° C. of this fluorine-containing elastomer was 85.

Preparation Example 2

Synthesis of Elastomer (B-2) Having COOH Group

A 3-liter stainless steel autoclave without an ignition source was charged with 1.5 liter of pure water and 3.0 g of $C_7F_{15}COONH_4$ as an emulsifying agent. After the inside of a system was sufficiently replaced with a nitrogen gas to deaerate the system, an inside temperature was raised to 80° C. while stirring at 700 rpm, and a gas mixture of VdF, TFE and HFP (molar ratio of VdF/TFE/HFP=19/11/70) was introduced thereto to give an inside pressure of 1.52 MPa·G. Then, 4 ml of aqueous solution of ammonium persulfate (APS) having a concentration of 7.5 mg/ml was introduced with pressurized nitrogen to initiate a reaction.

When the inside pressure was lowered to 1.48 MPa·G as polymerization proceeded, 0.77 g of $I(CF_2CF_2)_2I$ was introduced with pressurized nitrogen. Then, a gas mixture of VdF, TFE and HFP (molar ratio of VdF/TFE/HFP=50/20/30) was introduced so that the inside pressure was increased to 1.52 MPa·G, and thereafter, as the reaction proceeded, pressurized VdF, TFE and HFP were introduced to repeat increase and decrease in pressure between 1.48 MPa·G and 1.52 MPa·G, and at the same time, 14.1 g of $CF_2=CFOCF_2CF(CF_3)OCF_2CF_2COOH$ (CBVE) was introduced with pressurized nitrogen.

When the total charging amount of VdF, TFE and HFP reached 250 g five hours after starting of the polymerization reaction, the autoclave was cooled and unreacted monomers were discharged to obtain 1,732 g of an aqueous dispersion having a solid content of 14.1% by weight.

Out of the obtained aqueous dispersion, 1,500 g was diluted with 1,500 g of water, and slowly added with stirring to 1,500 g of 3.5% by weight aqueous solution of hydrochloric acid. After the solution was stirred for 30 minutes after the adding, coagulated substances were filtered, and the obtained polymer was poured into 500 g of HCFC-141b, followed by stirring for five minutes and filtering again. Then after washing with water and filtering were repeated four times, 12-hour vacuum drying was carried out at 100° C. to obtain 205 g of a polymer (crosslinkable fluorine-containing elastomer (B-2)).

As a result of an analysis, the monomer unit composition of this polymer was found to be VdF/TFE/HFP/CBVE=52.8/22.9/23.4/0.9 in % by mole. According to an infrared spectroscopic analysis, characteristic absorption of a carboxyl group was recognized at around 1,773 cm$^{-1}$ and characteristic absorption of an OH group was recognized at around 3,538 cm$^{-1}$ and 3,090 cm$^{-1}$. A Mooney viscosity at 100° C. of this fluorine-containing elastomer was 113.

Preparation Example 3

Synthesis of Elastomer (B-3) Having CNVE Group

A 3-liter stainless steel autoclave without an ignition source was charged with 1.5 liter of pure water and 3.0 g of $C_7F_{15}COONH_4$ as an emulsifying agent. After the inside of a system was sufficiently replaced with a nitrogen gas to deaerate the system, an inside temperature was raised to 80° C. while stirring at 700 rpm, and a gas mixture of VdF, TFE and HFP (molar ratio of VdF/TFE/HFP=19/11/70) was introduced thereto to give an inside pressure of 1.52 MPa·G. Then, 3 ml of aqueous solution of ammonium persulfate (APS) having a concentration of 15 mg/ml was introduced with pressurized nitrogen to initiate a reaction.

When the inside pressure was lowered to 1.48 MPa·G as polymerization proceeded, 0.77 g of $I(CF_2CF_2)_2I$ was introduced with pressurized nitrogen. Then, a gas mixture of VdF, TFE and HFP (molar ratio of VdF/TFE/HFP=50/20/30) was introduced so that the inside pressure was increased to 1.52 MPa·G, and thereafter, as the reaction proceeded, pressurized VdF, TFE and HFP were introduced to repeat increase and decrease in pressure between 1.48 MPa·G and 1.52 MPa·G, and at the same time, 11.0 g of $CF_2=CFOCF_2CF(CF_3)OCF_2CF_2CN$ (CNVE) was introduced with pressurized nitrogen.

When the total charging amount of VdF, TFE and HFP reached 125 g nine hours after starting of the polymerization reaction, the autoclave was cooled and unreacted monomers were discharged to obtain 1,684 g of an aqueous dispersion having a solid content of 7.7% by weight.

Out of the obtained aqueous dispersion, 1,600 g was slowly added with stirring to 1,600 g of 3.5% by weight aqueous solution of hydrochloric acid. After the solution was stirred for 30 minutes after the adding, coagulated substances were filtered, and the obtained polymer was poured into 500 g of HCFC-141b, followed by stirring for five minutes and filtering again. Then after washing with water and filtering were repeated four times, 48-hour vacuum drying was carried out at 70° C. to obtain 205 g of a polymer (crosslinkable fluorine-containing elastomer (B-3)).

As a result of an analysis, the monomer unit composition of this polymer was found to be VdF/TFE/HFP/CNVE=53.6/21.0/24.1/1.3 in % by mole. According to an infrared spectroscopic analysis, characteristic absorption of cyano group was recognized at around 2,169 cm$^{-1}$.

Preparation Example 4

Synthesis of Elastomer (B-4) Having CNVE Group

A 6-liter stainless steel autoclave without an ignition source was charged with 3 liter of pure water and 6.0 g of $C_7F_{15}COONH_4$ as an emulsifying agent. After the inside of a system was sufficiently replaced with a nitrogen gas to deaerate the system, an inside temperature was raised to 70° C. while stirring at 700 rpm, and a gas mixture of VdF, TFE and HFP (molar ratio of VdF/TFE/HFP=19/11/70) was introduced thereto to give an inside pressure of 1.52 MPa·G. Then, 2 g of $CF_2=CFOCF_2CF(CF_3)OCF_2CF_2CN$ (CNVE) and 3 ml of aqueous solution of ammonium persulfate (APS) having a concentration of 30 mg/ml were introduced with pressurized nitrogen to initiate a reaction.

As the reaction proceeded, pressurized VdF, TFE and HFP were introduced to repeat increase and decrease in pressure between 1.48 MPa·G and 1.52 MPa·G, and at the same time, 18 g of $CF_2=CFOCF_2CF(CF_3)OCF_2CF_2CN$ (CNVE) was introduced with pressurized nitrogen.

When the total charging amount of VdF, TFE and HFP reached 330 g nine hours after starting of the polymerization reaction, the autoclave was cooled and unreacted monomers were discharged to obtain 3,382 g of an aqueous dispersion having a solid content of 9.8% by weight.

Out of the obtained aqueous dispersion, 3,300 g was slowly added with stirring to 3,300 g of 3.5% by weight aqueous solution of hydrochloric acid. After the solution was stirred for 30 minutes after the adding, coagulated substances were filtered, and the obtained polymer was poured into 500 g of HCFC-141b, followed by stirring for five minutes and filtering again. Then after washing with water and filtering were repeated four times, 48-hour vacuum drying was carried out at 70° C. to obtain 320 g of a polymer (crosslinkable fluorine-containing elastomer (B-4)).

As a result of an analysis, the monomer unit composition of this polymer was found to be VdF/TFE/HFP/CNVE=52.1/22.5/23.8/1.6 in % by mole. According to an infrared spectroscopic analysis, characteristic absorption of cyano group was recognized at around 2,169 cm$^{-1}$.

Preparation Example 5

Synthesis of Elastomer (B-5) Having CNVE Group

A 3-liter stainless steel autoclave without an ignition source was charged with 1.5 liter of pure water and 3.0 g of $C_7F_{15}COONH_4$ as an emulsifying agent. After the inside of a system was sufficiently replaced with a nitrogen gas to deaerate the system, an inside temperature was raised to 70° C. while stirring at 700 rpm, and a gas mixture of VdF, TFE and perfluoro(methyl vinyl ether) (PMVE) (molar ratio of VdF/TFE/PMVE=70/12/18) was introduced thereto to give an inside pressure of 1.52 MPa·G. Then, 1.4 g of $CF_2$=$CFOCF_2CF(CF_3)OCF_2CF_2CN$ (CNVE) and 3 ml of aqueous solution of ammonium persulfate (APS) having a concentration of 15 mg/ml was introduced with pressurized nitrogen to initiate a reaction.

As the reaction proceeded, pressurized VdF, TFE and PMVE were introduced to repeat increase and decrease in pressure between 1.48 MPa·G and 1.52 MPa·G, and at the same time, 12.6 g of $CF_2$=$CFOCF_2CF(CF_3)OCF_2CF_2CN$ (CNVE) was introduced with pressurized nitrogen.

When the total charging amount of VdF, TFE and PMVE reached 260 g nine hours after starting of the polymerization reaction, the autoclave was cooled and unreacted monomers were discharged to obtain 1,766 g of an aqueous dispersion having a solid content of 15.0% by weight.

Out of the obtained aqueous dispersion, 1,700 g was slowly added with stirring to 1,700 g of 3.5% by weight aqueous solution of hydrochloric acid. After the solution was stirred for 30 minutes after the adding, coagulated substances were filtered, and the obtained polymer was poured into 500 g of HCFC-141b, followed by stirring for five minutes and filtering again. Then after washing with water and filtering were repeated four times, 48-hour vacuum drying was carried out at 70° C. to obtain 315 g of a polymer (crosslinkable fluorine-containing elastomer (B-5)).

As a result of an analysis, the monomer unit composition of this polymer was found to be VdF/TFE/PMVE/CNVE=66.2/13.5/19.3/1.0 in % by mole. According to an infrared spectroscopic analysis, characteristic absorption of cyano group was recognized at around 2,169 cm$^{-1}$.

Preparation Example 6

Synthesis of Elastomer (B-6) Having CNVE Group

A 6-liter stainless steel autoclave without an ignition source was charged with 3 liter of pure water and 6.0 g of $C_7F_{15}COONH_4$ as an emulsifying agent. After the inside of a system was sufficiently replaced with a nitrogen gas to deaerate the system, an inside temperature was raised to 70° C. while stirring at 700 rpm, and a gas mixture of VdF, TFE and HFP (molar ratio of VdF/TFE/HFP=19/11/70) was introduced thereto to give an inside pressure of 1.52 MPa·G. Then, 1.4 g of $CF_2$=$CFOCF_2CF(CF_3)OCF_2CF_2CN$ (CNVE) and 3 ml of aqueous solution of ammonium persulfate (APS) having a concentration of 30 mg/ml was introduced with pressurized nitrogen to initiate a reaction.

As the reaction proceeded, pressurized VdF, TFE and HFP were introduced to repeat increase and decrease in pressure between 1.48 MPa·G and 1.52 MPa·G, and at the same time, 12.6 g of $CF_2$=$CFOCF_2CF(CF_3)OCF_2CF_2CN$ (CNVE) was introduced with pressurized nitrogen.

When the total charging amount of VdF, TFE and HFP reached 330 g nine hours after starting of the polymerization reaction, the autoclave was cooled and unreacted monomers were discharged to obtain 3,211 g of an aqueous dispersion having a solid content of 10.1% by weight.

Out of the obtained aqueous dispersion, 3,200 g was slowly added with stirring to 3,300 g of 3.5% by weight aqueous solution of hydrochloric acid. After the solution was stirred for 30 minutes after the adding, coagulated substances were filtered, and the obtained polymer was poured into 500 g of HCFC-141b, followed by stirring for five minutes and filtering again. Then after washing with water and filtering were repeated four times, 48-hour vacuum drying was carried out at 70° C. to obtain 315 g of a polymer (crosslinkable fluorine-containing elastomer (B-6)).

As a result of an analysis, the monomer unit composition of this polymer was found to be VdF/TFE/HFP/CNVE=52.5/22.7/23.7/1.1 in % by mole. According to an infrared spectroscopic analysis, characteristic absorption of cyano group was recognized at around 2,169 cm$^{-1}$.

Example 1

To the crosslinkable fluorine-containing elastomer (B-1) obtained in Preparation Example 1 were mixed 2,2-bis(3-amino-4-hydroxyphenyl)hexafluoropropane (crosslinking agent OH-AF) as the compound (A) which was a crosslinking agent and thermal black (MT-C available from Cancarb Co., Ltd.) as a filler in a weight ratio of 100/3.1/20, followed by kneading with an open roll to prepare a crosslinkable composition.

This crosslinkable composition was subjected to press-crosslinking at 200° C. for 60 minutes and further oven-crosslinking at 200° C. for 2 hours, at 260° C. for 5 hours, and then at 290° C. for 18 hours to prepare a 2 mm thick crosslinked article and a test sample of O-ring (AS-568A-214). Compression set of this crosslinked article was measured. The results are shown in Table 1.

Example 2

To the crosslinkable fluorine-containing elastomer (B-2) obtained in Preparation Example 2 were mixed 2,2-bis(3-amino-4-hydroxyphenyl)hexafluoropropane (crosslinking agent OH-AF) as the compound (A) which was a crosslinking agent and thermal black (MT-C available from Cancarb Co., Ltd.) as a filler in a weight ratio of 100/1.8/20, followed by kneading with an open roll to prepare a crosslinkable composition.

This crosslinkable composition was subjected to press-crosslinking at 200° C. for 90 minutes and further oven-crosslinking at 200° C. for 2 hours, at 260° C. for 5 hours, and then at 290° C. for 18 hours to prepare a 2 mm thick crosslinked article and a test sample of O-ring (AS-568A-

214). Compression set of this crosslinked article was measured. The results are shown in Table 1.

Example 3

To the crosslinkable fluorine-containing elastomer (B-3) obtained in Preparation Example 3 were mixed 2,2-bis(3-amino-4-hydroxyphenyl)hexafluoropropane (crosslinking agent OH-AF) as the compound (A) which was a crosslinking agent and thermal black (MT-C available from Cancarb Co., Ltd.) as a filler in a weight ratio of 100/2.5/20, followed by kneading with an open roll to prepare a crosslinkable composition.

This crosslinkable composition was subjected to press-crosslinking at 200° C. for 60 minutes and further oven-crosslinking at 200° C. for 2 hours, at 260° C. for 5 hours, and then at 290° C. for 18 hours to prepare a 2 mm thick crosslinked article and a test sample of O-ring (AS-568A-214). Compression set of this crosslinked article was measured. The results are shown in Table 1.

Comparative Example 1

To the crosslinkable fluorine-containing elastomer (B-1) obtained in Preparation Example 1 were mixed 2,2-bis(3,4-diaminophenyl)hexafluoropropane (crosslinking agent TA-AF) as the compound (A) which was a crosslinking agent and thermal black (MT-C available from Cancarb Co., Ltd.) as a filler in a weight ratio of 100/3.8/20, followed by kneading with an open roll to prepare a crosslinkable composition.

This crosslinkable composition was subjected to press-crosslinking at 180° C. for 90 minutes and further oven-crosslinking at 200° C. for 2 hours, at 260° C. for 5 hours, and then at 290° C. for 18 hours to prepare a 2 mm thick crosslinked article and a test sample of O-ring (AS-568A-214). Compression set of this crosslinked article was measured. The results are shown in Table 1.

Comparative Example 2

A commercially available fluorine-containing elastomer 1 (a fluorine-containing elastomer comprising VdF and HFP in a % by mole ratio of 78/22), thermal black (MT-C available from Cancarb Co., Ltd.), an acid acceptor (Caldic#2000 available from Kyowa Chemical Industry Co., Ltd.) and magnesium oxide (MA-150 available from Kyowa Chemical Industry Co., Ltd.) were mixed in a weight ratio of 100/20/6/3, followed by kneading with an open roll to prepare a crosslinkable composition.

This crosslinkable composition was subjected to press-crosslinking at 170° C. for 10 minutes and further oven-crosslinking at 230° C. for 24 hours to prepare a 2 mm thick crosslinked article and a test sample of O-ring (AS-568A-214). Compression set of this crosslinked article was measured. The results are shown in Table 1.

TABLE 1

|  | Ex. 1 | Ex. 2 | Ex. 3 | Com. Ex. 1 | Com. Ex. 2 |
|---|---|---|---|---|---|
| Composition |  |  |  |  |  |
| Crosslinkable fluorine-containing elastomer (B-1) | 100 |  |  | 100 |  |
| Crosslinkable fluorine-containing elastomer (B-2) |  | 100 |  |  |  |
| Crosslinkable fluorine-containing elastomer (B-3) |  |  | 100 |  |  |
| Fluorine-containing elastomer 1 |  |  |  |  | 100 |
| MT carbon | 20 | 20 | 20 | 20 | 20 |
| Caldic#2000 |  |  |  |  | 6 |
| MA-150 |  |  |  |  | 3 |
| Crosslinking agent TA-AF |  |  |  | 3.8 |  |
| Crosslinking agent OH-AF | 3.1 | 1.8 | 2.5 |  |  |
| Compression set (%) |  |  |  |  |  |
| 250° C. × 70 hours | 44 | 41 | 32 | 41 | 38 |
| 250° C. × 168 hours | 57 | 57 | 50 | 58 | 62 |
| 250° C. × 336 hours | 70 | 75 | 67 | 75 | 86 |
| 250° C. × 500 hours | 79 | 85 | 77 | 89 | 99 |
| 250° C. × 1,000 hours | 95 | 102 | 92 | 99 | — |

Example 4

To the crosslinkable fluorine-containing elastomer (B-4) obtained in Preparation Example 4 were mixed 2,2-bis(3-amino-4-hydroxyphenyl)hexafluoropropane (crosslinking agent OH-AF) as the compound (A) which was a crosslinking agent and thermal black (MT-C available from Cancarb Co., Ltd.) as a filler in a weight ratio of 100/2.9/20, followed by kneading with an open roll to prepare a crosslinkable fluorine-containing elastomer composition.

This crosslinkable composition was subjected to press-crosslinking at 200° C. for 30 minutes and further oven-crosslinking at 200° C. for 2 hours, at 260° C. for 5 hours, and then at 290° C. for 18 hours to prepare a 2 mm thick crosslinked article and a test sample of O-ring (AS-568A-214). Compression set of this crosslinked article was measured. The results are shown in Table 2.

Example 5

To the crosslinkable fluorine-containing elastomer (B-4) obtained in Preparation Example 4 were mixed 3,3'-bishydroxybenzidine (crosslinking agent DOH) as the compound which was a crosslinking agent and thermal black (MT-C available from Cancarb Co., Ltd.) as a filler in a weight ratio of 100/1.5/20, followed by kneading with an open roll to prepare a crosslinkable fluorine-containing elastomer composition.

This crosslinkable composition was subjected to press-crosslinking at 200° C. for 60 minutes and further oven-crosslinking at 200° C. for 2 hours, at 260° C. for 5 hours, and then at 290° C. for 18 hours to prepare a 2 mm thick crosslinked article and a test sample of O-ring (AS-568A-214). Compression set of this crosslinked article was measured. The results are shown in Table 2.

Example 6

To the crosslinkable fluorine-containing elastomer (B-4) obtained in Preparation Example 4 were mixed thermal black (MT-C available from Cancarb Co., Ltd.) and silicon nitride (available from Ube Industries, Ltd.) as fillers in a weight ratio of 100/20/0.75, followed by kneading with an open roll to prepare a crosslinkable fluorine-containing elastomer composition.

This crosslinkable composition was subjected to press-crosslinking at 200° C. for 60 minutes and further oven-crosslinking at 200° C. for 2 hours, at 260° C. for 5 hours, and then at 290° C. for 18 hours to prepare a 2 mm thick crosslinked article and a test sample of O-ring (AS-568A-214). Compression set of this crosslinked article was measured. The results are shown in Table 2.

Example 7

To the crosslinkable fluorine-containing elastomer (B-4) obtained in Preparation Example 4 were mixed 2,2-bis(3-ammoniumacetate-4-hydroxyphenyl)hexafluoropropane (crosslinking agent Salt-OH-AF) as the compound (A) which was a crosslinking agent and thermal black (MT-C available from Cancarb Co., Ltd.) as a filler in a weight ratio of 100/2.2/20, followed by kneading with an open roll to prepare a crosslinkable fluorine-containing elastomer composition.

This crosslinkable composition was subjected to press-crosslinking at 200° C. for 15 minutes and further oven-crosslinking at 200° C. for 2 hours, at 260° C. for 5 hours, and then at 290° C. for 18 hours to prepare a 2 mm thick crosslinked article and a test sample of O-ring (AS-568A-214). Compression set of this crosslinked article was measured. The results are shown in Table 2.

Example 8

To the crosslinkable fluorine-containing elastomer (B-4) obtained in Preparation Example 4 were mixed 2,2-bis(3-amino-4-hydroxyphenyl)hexafluoropropane (crosslinking agent OH-AF) as the compound (A) which was a crosslinking agent and thermal black (MT-C available from Cancarb Co., Ltd.) and bituminous coal filler (Mineral Black 325BA available from Keystone Filler & Mfg.) as fillers in a weight ratio of 100/2.4/16/20, followed by kneading with an open roll to prepare a crosslinkable fluorine-containing elastomer composition.

This crosslinkable composition was subjected to press-crosslinking at 200° C. for 30 minutes and further oven-crosslinking at 200° C. for 2 hours, at 260° C. for 5 hours, and then at 290° C. for 18 hours to prepare a 2 mm thick crosslinked article and a test sample of O-ring (AS-568A-214). Compression set of this crosslinked article was measured. The results are shown in Table 2.

Example 9

To the crosslinkable fluorine-containing elastomer (B-5) obtained in Preparation Example 5 were mixed 2,2-bis(3-amino-4-hydroxyphenyl)hexafluoropropane (crosslinking agent OH-AF) as the compound (A) which was a crosslinking agent and thermal black (MT-C available from Cancarb Co., Ltd.) as a filler in a weight ratio of 100/2.1/30, followed by kneading with an open roll to prepare a crosslinkable fluorine-containing elastomer composition.

This crosslinkable composition was subjected to press-crosslinking at 200° C. for 60 minutes and further oven-crosslinking at 200° C. for 2 hours, at 260° C. for 5 hours, and then at 290° C. for 18 hours to prepare a 2 mm thick crosslinked article and a test sample of O-ring (AS-568A-214). Compression set of this crosslinked article was measured. The results are shown in Table 2.

Example 10

To the crosslinkable fluorine-containing elastomer (B-6) obtained in Preparation Example 6 were mixed 2,2-bis(3-amino-4-hydroxyphenyl)hexafluoropropane (crosslinking agent OH-AF) as the compound (A) which was a crosslinking agent and thermal black (MT-C available from Cancarb Co., Ltd.) and molecular sieve (4A, powder, available from Aldrich) as fillers in a weight ratio of 100/2.6/20/3, followed by kneading with an open roll to prepare a crosslinkable fluorine-containing elastomer composition.

This crosslinkable composition was subjected to press-crosslinking at 200° C. for 15 minutes and further oven-crosslinking at 200° C. for 2 hours, at 260° C. for 5 hours, and then at 290° C. for 18 hours to prepare a 2 mm thick crosslinked article and a test sample of O-ring (AS-568A-214). Compression set of this crosslinked article was measured. The results are shown in Table 2.

Example 11

To the crosslinkable fluorine-containing elastomer (B-6) obtained in Preparation Example 6 were mixed 2,2-bis(3-amino-4-hydroxyphenyl)hexafluoropropane (crosslinking agent OH-AF) as the compound (A) which was a crosslinking agent and thermal black (MT-C available from Cancarb Co., Ltd.) and silica (CARPLEX #1120 available from Degussa Japan) as fillers in a weight ratio of 100/2.6/20/3, followed by kneading with an open roll to prepare a crosslinkable fluorine-containing elastomer composition.

This crosslinkable composition was subjected to press-crosslinking at 200° C. for 15 minutes and further oven-crosslinking at 200° C. for 2 hours, at 260° C. for 5 hours, and then at 290° C. for 18 hours to prepare a 2 mm thick crosslinked article and a test sample of O-ring (AS-568A-214).

Comparative Example 3

A commercially available fluorine-containing elastomer 2 (a fluorine-containing elastomer comprising VdF, TFE and HFP in a % by mole ratio of 67.0/13.9/19.1), thermal black (MT-C available from Cancarb Co., Ltd.), triallylisocyanurate (available from Nippon Chemical Co., Ltd.) and 2,5-dimethyl-2,5-di(t-butylperoxy)hexane (Perhexa 25B available from NOF CORPORATION) in a weight ratio of 100/30/3/1.5, followed by kneading with an open roll to prepare a crosslinkable composition.

This crosslinkable composition was subjected to press-crosslinking at 170° C. for 10 minutes and further oven-crosslinking at 230° C. for 24 hours to prepare a 2 mm thick crosslinked article and a test sample of O-ring (AS-568A-214). Compression set of this crosslinked article was measured. The results are shown in Table 2.

The crosslinkable compositions obtained in Examples 4 to 11 and Comparative Example 3 were subjected to measurement with a Curastometer by the method mentioned below. The results are shown in Table 2.

(Measurement with Curastometer)

A part each of these crosslinkable compositions was collected, and an optimum vulcanization time T90 was measured with a Curastometer (brand name: Curastometer Model II available from JSR Co., Ltd.) under the condition of 210° C. (Comparative Example 3: 170° C.) according to JIS K 6300.

As the reaction proceeded, pressurized VdF, TFE and HFP were introduced to repeat increase and decrease in pressure between 1.48 MPa·G and 1.52 MPa·G, and at the same time,

TABLE 2

| | Ex. 4 | Ex. 5 | Ex. 6 | Ex. 7 | Ex. 8 |
|---|---|---|---|---|---|
| Composition | | | | | |
| Crosslinkable fluorine-containing elastomer (B-4) | 100 | 100 | 100 | 100 | 100 |
| Crosslinkable fluorine-containing elastomer (B-5) | | | | | |
| Crosslinkable fluorine-containing elastomer (B-6) | | | | | |
| Fluorine-containing elastomer 2 | | | | | |
| MT carbon | 20 | 20 | 20 | 20 | 16 |
| Mineral Black | | | | | 20 |
| Crosslinking agent DOH | | 1.5 | | | |
| Crosslinking agent Salt-OH-AF | | | | 2.2 | |
| Crosslinking agent OH-AF | 2.9 | | | | 2.4 |
| Silicon nitride | | | 0.75 | | |
| Triallylisocyanurate | | | | | |
| Perhexa 25B | | | | | |
| Molecular sieve 4A | | | | | |
| CARPLEX #1120 | | | | | |
| Vulcanizability, Curastometer II Optimum vulcanization speed T90 (min) | 16 | 46 | 40 | 13 | 28 |
| Compression set (%) | | | | | |
| 250° C. × 70 hours | 28 | 44 | 30 | 43 | 33 |
| 250° C. × 168 hours | 40 | 64 | 48 | 65 | — |
| 250° C. × 336 hours | 55 | 82 | 60 | 80 | — |
| 250° C. × 500 hours | 65 | 91 | 69 | 89 | — |
| 250° C. × 1,000 hours | 79 | 99 | 84 | 99 | — |

| | Ex. 9 | Ex. 10 | Ex. 11 | Com. Ex. 3 |
|---|---|---|---|---|
| Composition | | | | |
| Crosslinkable fluorine-containing elastomer (B-4) | | | | |
| Crosslinkable fluorine-containing elastomer (B-5) | 100 | | | |
| Crosslinkable fluorine-containing elastomer (B-6) | | 100 | 100 | |
| Fluorine-containing elastomer 2 | | | | 100 |
| MT carbon | 30 | 20 | 20 | 30 |
| Mineral Black | | | | |
| Crosslinking agent DOH | | | | |
| Crosslinking agent Salt-OH-AF | | | | |
| Crosslinking agent OH-AF | 2.1 | 2.6 | 2.6 | |
| Silicon nitride | | | | |
| Triallylisocyanurate | | | | 3 |
| Perhexa 25B | | | | 1.5 |
| Molecular sieve 4A | | 3 | | |
| CARPLEX #1120 | | | 3 | |
| Vulcanizability, Curastometer II Optimum vulcanization speed T90 (min) | 53 | 7 | 8 | 1.7 |
| Compression set (%) | | | | |
| 250° C. × 70 hours | 28 | 37 | — | 51 |
| 250° C. × 168 hours | 44 | 53 | — | 88 |
| 250° C. × 336 hours | 59 | 72 | — | 109 |
| 250° C. × 500 hours | 69 | 84 | — | — |
| 250° C. × 1,000 hours | 89 | 95 | — | — |

Preparation Example 7

Synthesis of Elastomer (B-7) Having CNVE Group

A 6-liter stainless steel autoclave without an ignition source was charged with 3 liter of pure water and 6.0 g of $C_5F_{11}COONH_4$ as an emulsifying agent. After the inside of a system was sufficiently replaced with a nitrogen gas to deaerate the system, an inside temperature was raised to 80° C. while stirring at 600 rpm, and a gas mixture of VdF, TFE and HFP (molar ratio of VdF/TFE/HFP=19/11/70) was introduced thereto to give an inside pressure of 1.52 MPa·G. Then, 3 g of $CF_2$=$CFOCF_2CF(CF_3)OCF_2CF_2CN$ (CNVE) and 6 ml of aqueous solution of ammonium persulfate (APS) having a concentration of 0.3 g/ml were introduced with pressurized nitrogen to initiate a reaction.

45 g of $CF_2$=$CFOCF_2CF(CF_3)OCF_2CF_2CN$ (CNVE) and 1 g of diethyl malonate were introduced with pressurized nitrogen.

When the total charging amount of VdF, TFE and HFP reached 1,000 g ten hours after starting of the polymerization reaction, the autoclave was cooled and unreacted monomers were discharged to obtain 4,037 g of an aqueous dispersion having a solid content of 24.4% by weight.

Out of the obtained aqueous dispersion, 3,900 g was slowly added with stirring to 4,900 g of 0.1% by weight aqueous solution of aluminum sulfate. After the adding, coagulated substances were filtered, and the obtained polymer was subjected to washing with water and filtering four times, and 48-hour vacuum drying was carried out at 70° C. to obtain 950 g of a polymer (crosslinkable fluorine-containing elastomer (B-7)).

As a result of an analysis, the monomer unit composition of this polymer was found to be VdF/TFE/HFP/CNVE=50.3/20.9/27.1/1.7 in % by mole. According to an infrared spectroscopic analysis, characteristic absorption of a nitrile group was recognized at around 2,169 cm$^{-1}$.

Example 12

To the crosslinkable fluorine-containing elastomer (B-7) obtained in Preparation Example 7 were mixed 2,2-bis(3-amino-4-hydroxyphenyl)hexafluoropropane (crosslinking agent OH-AF) as the compound (A) which was a crosslinking agent and carbon black (MT-C available from Cancarb Co., Ltd.) as a filler in a weight ratio of 100/3.1/20, followed by kneading with an open roll to prepare a crosslinkable fluorine-containing elastomer composition.

Example 13

To the crosslinkable fluorine-containing elastomer (B-7) obtained in Preparation Example 7 were mixed 2,2-bis(3-amino-4-hydroxyphenyl)hexafluoropropane (crosslinking agent OH-AF) as the compound (A) which was a crosslinking agent and carbon black (MT-C available from Cancarb Co., Ltd.) and silicon nitride (available from Ube Industries, Ltd.) as fillers in a weight ratio of 100/2.5/20/0.1, followed by kneading with an open roll to prepare a crosslinkable fluorine-containing elastomer composition.

A part each of the crosslinkable compositions of Example 12 and 13 was collected, and an optimum vulcanization time T90 was measured with a Curastometer (brand name: Curastometer Model II available from JSR Co., Ltd.) under the condition of 210° C. according to JIS K 6300. The results are shown in Table 3.

These crosslinkable compositions were subjected to press-crosslinking at 180° C. for 15 minutes and further oven-crosslinking at 200° C. for 2 hours, at 260° C. for 5 hours, and then at 290° C. for 18 hours to prepare a 2 mm thick crosslinked article and a test sample of O-ring (AS-568A-214). Compression set of this crosslinked article was measured. The results are shown in Table 3.

Comparative Example 4

A commercially available fluorine-containing elastomer 1 (a fluorine-containing elastomer comprising VdF and HFP in a % by mole ratio of 78/22), thermal black (MT-C available from Cancarb Co., Ltd.), an acid acceptor (Caldic#2000 available from Kyowa Chemical Industry Co., Ltd.) and magnesium oxide (MA-150 available from Kyowa Chemical Industry Co., Ltd.) were mixed in a weight ratio of 100/20/6/3, followed by kneading with an open roll to prepare a crosslinkable composition.

A part of this crosslinkable composition was collected, and an optimum vulcanization time T90 was measured with a Curastometer (brand name: Curastometer Model II available from JSR Co., Ltd.) under the condition of 170° C. according to JIS K 6300. The results are shown in Table 3.

This crosslinkable composition was subjected to press-crosslinking at 170° C. for 10 minutes and further oven-crosslinking at 230° C. for 24 hours to prepare a 2 mm thick crosslinked article and a test sample of O-ring (AS-568A-214). Compression set of this crosslinked article was measured. The results are shown in Table 3.

TABLE 3

| Composition (part by weight) | Ex. 12 | Ex. 13 | Com. Ex. 4 |
|---|---|---|---|
| Crosslinkable fluorine-containing elastomer (B-7) | 100 | 100 | |
| Fluorine-containing elastomer 1 | | | 100 |
| MT carbon | 20 | 20 | 20 |
| Crosslinking agent OH-AF | 3.1 | 2.5 | |
| Silicon nitride | | 0.1 | |
| Caldic #2000 | | | 6 |
| MA-150 | | | 3 |
| Vulcanizability, Curastometer II Optimum vulcanization speed T90 (min) | 5.8 | 4.5 | 4.8 |
| Compression set (%) 250° C. | | | |
| 70 hours | 36 | 27 | 38 |
| 168 hours | 51 | 42 | 62 |
| 336 hours | 67 | 56 | 86 |
| 500 hours | 75 | 67 | 99 |
| 1,000 hours | 92 | 84 | — |
| Compression set (%) 280° C. | | | |
| 70 hours | 56 | 50 | 78 |
| 168 hours | 76 | 62 | 92 |
| 336 hours | 91 | 77 | 108 |
| 500 hours | 97 | 89 | — |
| 1,000 hours | 111 | 102 | — |

INDUSTRIAL APPLICABILITY

The crosslinkable composition of the present invention can provide a molded article and a sealing material for oxygen sensor which have excellent long-term heat resistance and satisfactory compression set since it comprises a compound having at least one specific crosslinkable reaction group and a nonperfluoro fluorine-containing elastomer being crosslinkable with the compound.

The invention claimed is:

1. A crosslinkable composition comprising:

a compound represented by the general formula (4):

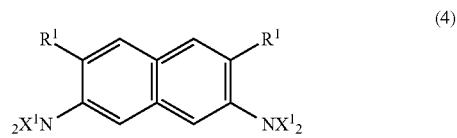

wherein $X^1$s are the same or different and each is hydrogen atom or a monovalent organic group; $R_1$ is $OR^3$— or —$SR^3$, and $R^3$ is a hydrogen atom or a monovalent organic group;

a compound represented by the general formula (5):

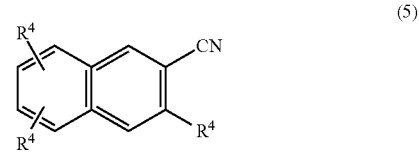

wherein $R^4$s are the same or different and each is hydrogen, atom or cyano group;

a compound represented by the general formula (6):

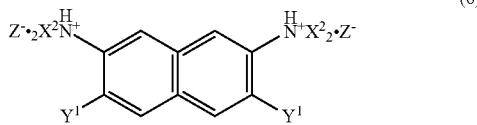

(6)

wherein $X^2$s are the same or different and each is hydrogen atom or monovalent organic group; $Z^-$ is an anion derived from an acid; $Y^1$ is —H, —OH, —SH or —$N^+X^2{}_2H.Z^-$ ($X^2$ and $Z^-$ are as defined above), and (B) a nonperfluoro fluorine-containing elastomer being capable of crosslinking reaction with the compound (A), wherein the nonperfluoro fluorine-containing elastomer (B) is selected from the group consisting of (1) vinylidene fluoride/hexafluoropropylene copolymer,
(2) vinylidene fluoride/tetrafluoroethylene/hexafluoropropylene copolymer,
(3) tetrafluoroethylene/propylene copolymer,
(4) hexafluoropropylene/ethylene copolymer,
(5) tetrafluoroethylene/vinylidene fluoride/fluoro(alkyl vinyl ether) copolymer, and
(6) chlorotrifluoroethylene/vinylidene fluoride/fluoro(alkyl vinyl ether) copolymer.

2. The crosslinkable composition of claim 1, wherein the compound (A) is a compound having a symmetric structure.

3. The crosslinkable composition of claim 1, wherein the nonperfluoro fluorine-containing elastomer (B) has, at least at either its trunk chain or an end of its side chain, at least one kind of crosslinkable functional group selected from the group consisting of a cyano group, a carboxyl group, an alkoxycarbonyl group and an acid halide group as a cure site being capable of crosslinking reaction with the compound (A).

4. The crosslinkable composition of claim 3, wherein the nonperfluoro fluorine-containing elastomer (B) has cyano group as a cure site at least at either its trunk chain or an end of its side chain.

5. The crosslinkable composition of claim 3, wherein the nonperfluoro fluorine-containing elastomer (B) has a crosslinkable functional group as a cure site at an end of its side chain.

6. The crosslinkable composition of claim 1, wherein the nonperfluoro fluorine-containing elastomer (B) has at least one kind of crosslinkable functional group selected from the group consisting of a cyano group, a carboxyl group, an alkoxycarbonyl group and an acid halide group in its side chain in an amount of 0.1 to 5% by mole.

7. The crosslinkable composition of claim 1, wherein $Y^1$ is —H, —SH or —$N^+X^2{}_2H \cdot Z^-$ where $X^2$ and $Z^-$ are as defined above.

* * * * *